United States Patent Office 3,704,101
Patented Nov. 28, 1972

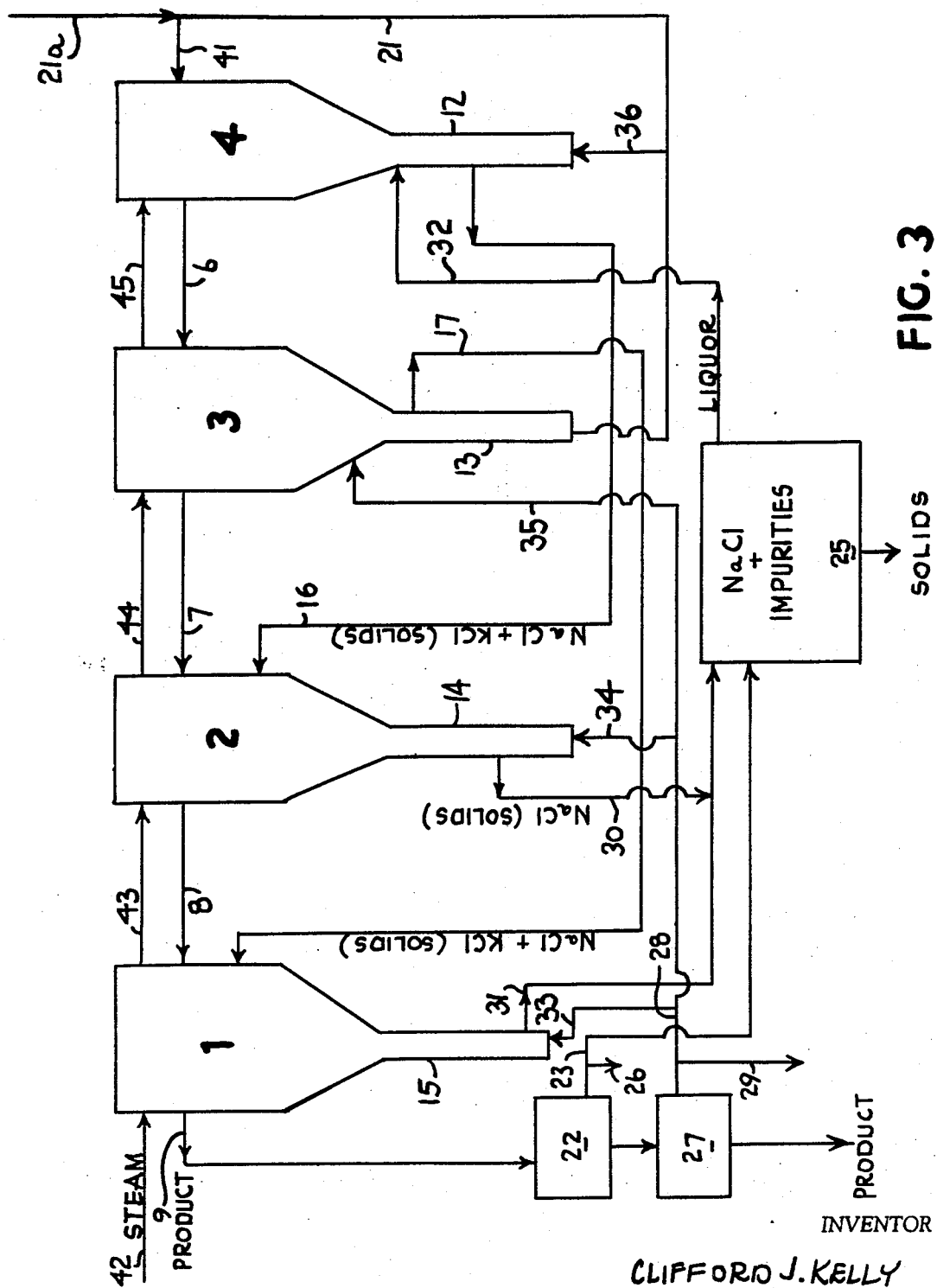

3,704,101
METHOD FOR OPERATING MULTIPLE EFFECT EVAPORATORS
Clifford J. Kelly, Regina, Saskatchewan, Canada, assignor to Kalium Chemicals Limited, Regina, Saskatchewan, Canada
Filed Aug. 25, 1970, Ser. No. 66,779
Int. Cl. B01d 9/00, 3/04
U.S. Cl. 23—296          17 Claims

ABSTRACT OF THE DISCLOSURE

A method of providing for the recovery of the maximum quantity of a desired salt in a multiple salt solution is shown wherein the solution is subjected to several evaporation steps. Crystallized desired salt from one evaporation step is forwarded to a hotter evaporator where it can be dissolved to further saturate solution therein with the desired salt.

INTRODUCTION

The present invention relates to the recovery of solid salts from solutions containing two or more salts therein. More particularly, the invention relates to the recovery of salts from solution containing two or more salts in multiple effect evaporator systems in an efficient manner. Still more particularly, the present invention relates to the recovery of solid potassium chloride from solutions containing both sodium chloride and potassium chloride in a multiple effect evaporator system in a more efficient manner.

BACKGROUND OF INVENTION

One recognized method of recovering a salt from aqueous solution containing the desired salt as well as other salts with which the desired salt does not form a compound is to remove water from the solution until the solution is brought to near the invariant composition for the particular solution of salts involved. The solution is then cooled to crystallize the desired salt. Thus, for example, in recovering potassium chloride from aqueous solutions containing both potassium chloride and sodium chloride it is customary to first remove water from such solutions, preferably by evaporation, until the solution approaches the invariant composition. The solution is then subsequently cooled to crystallize potassium chloride while the sodium chloride remains in solution. Typically in operations of this character large amounts of sodium chloride and significant amounts of impurities, notably carbonates and sulfates of cations other than sodium and potassium are crystallized during the evaporation step. This is typical since the solutions are usually prepared from naturally occurring potassium chloride ores or brines. These brines or potassium chloride solutions are typically obtained by leaching ores containing sodium and potassium chlorides using water or other suitable solvents (KCl and/or NaCl brines) and solution mining KCl ores with water and/or various solvents.

"Invariant composition" as used herein in the specification and claims means the composition at which an aqueous solution at a given temperature is saturated with respect to two or more salts. Thus, for example, the invariant composition of sodium chloride and potassium chloride is that composition at which an aqueous solution of these salts at a given temperature is saturated with respect to both sodium chloride and potassium chloride. This invariant composition may be affected to some extent by the presence of compounds other than the sodium chloride or potassium chloride present in the solution.

In a typical evaporation operation conducted on a plant scale there is usually provided a series of evaporators or as they are called, evaporator effects. Each evaporator effect normally operates at a different temperature. In the evaporation of solutions containing both NaCl and KCl, the evaporator effects advantageously operate at progressively higher temperatures in the direction of liquor flow.

A typical evaporator effect may comprise an evaporator communicating with an elutriation leg. The evaporator is usually in the form of a large vessel or tank and the elutriation leg is usually in the form of a smaller tank or column openly communicating with the lower portion or bottom of the evaporator. As the solution passes through the evaporator, water is removed therefrom. The solution becomes more concentrated with respect to the salts therein. Eventually solids crystallize, settle to the bottom of the evaporator and fall into the elutriation leg.

The solubility of KCl in aqueous solution increases with increasing temperature of the aqueous solution in which it is to be dissolved or is dissolved in. The solubility of NaCl is significantly less dependent on temperature than KCl, the solubility of which is conversely more temperature dependent in the same environment. Thus, in an aqueous solution containing both potassium chloride and sodium chloride the crystallizing solids in an evaporation process conducted on such a solution predominantly comprise sodium chloride until the invariant composition for that solution is reached. Significant quantities of impurities may be crystallized along with the sodium chloride. Typical of such impurities are calcium sulfate and calcium carbonate.

Weak feed solution to a multiple effect evaporation system is typically introduced at least in part at the lower portion of an elutriation leg of the evaporator effect as a fluidizing liquid and this liquid rises up through the elutriation leg countercurrent to the solids settling therein from the associated evaporator. Ascending fluid streams carry substantially all the fine particle impurities back into the evaporator while the relatively heavy particles settle to the lower portion of the elutriation leg. In evaporator effects in which most of the impurities are of small size, relatively pure solid salt is conveniently recovered from an elutriation leg underflow. Note in this connection the discussion in U.S. Pat. 3,365,278.

Multiple effect evaporators operated in the conventional manner in this service are typically heated by steam vapors in a direction opposite the direction of the flow of the liquor to be concentrated. Thus, the evaporator which encounters liquor or solution initially is typically an evaporator which operates at a substantially lower temperature than the evaporator in the series which encounters the liquor or solution last. This latter evaporator is heated with steam and the next evaporator is heated with the vapors from this evaporator and so on to the last evaporator in series. A general discussion of the operation of multiple effect systems is contained in Perry's Handbook, 3rd edition (1950), pages 508–510, McGraw-Hill Publishing, New York. Operations in this manner are extremely efficient from the standpoint of steam economy and perform satisfactorily in most instances in the recovery of solid salts from solutions.

In the operation of multiple effect evaporator systems of given design, different operating conditions often will cause premature crystallization of salts. This is the result of a fixed design for a given set of conditions which design cannot be changed when one or more of the conditions on which it was based has changed. When premature crystallization of salts does occur in the early effects of a multiple effect evaporator system, the system is usually prevented from achieving its desired ends, steam economy for example. Thus, the fixed nature of an already designed multiple effect evaporator system prevents capitalizing on the technological improvements made elsewhere in the system when the system is faced with changing process conditions (increased feed temperatures, changing feed compositions, etc.). Thus, when in an already fixed system, feed quality is improved, it cannot be exploited without a substantial change in design.

THE PRESENT INVENTION

In accordance with the present invention a system is provided which permits operation in an efficient manner of a fixed multiple effect evaporator system when a process change not designed into the system has occurred. Thus, in accordance with the instant invention a unique method is provided for utilizing solid phase material crystallized prematurely in a multiple effect evaporator system so that this premature solids discharge does not deleteriously effect the overall evaporation operation.

To more fully appreciate the contribution of the instant invention reference is made to the accompanying drawings in which:

FIG. 3 shows diagrammatically a multiple effect evaporator system employing the instant invention.

In dealing with multiple salt solutions, that is with solution systems involving for example two salts and water, and where the two salts do not form a compound, isothermal solubility curves can be drawn which will predict the composition of the solutions containing the two salts in different proportions in equilibrium with either of the two solid salts involved in the solution.

Figure 1:
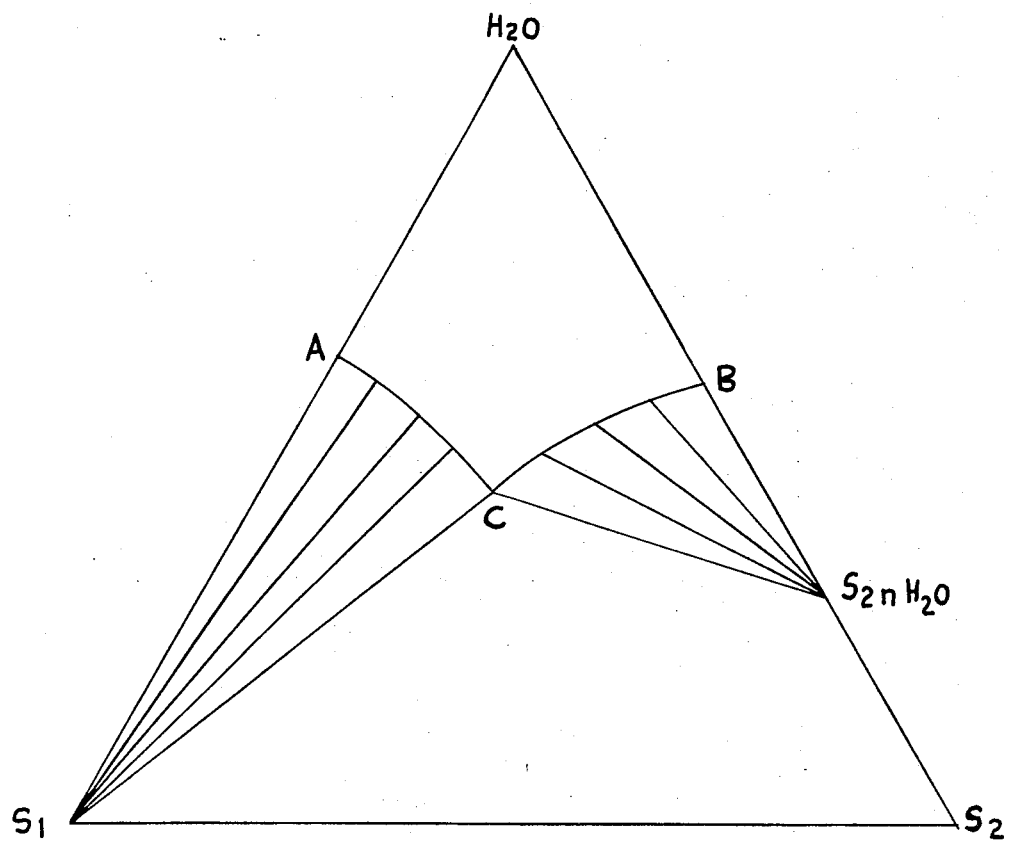
FIG. 1 represents an isothermal curve for a theoretical solution of $H_2O$ and two salts $S_1$ and $S_2$.

To illustrate, in FIG. 1 there is shown an isothermal curve for a system involving salts $S_1$ and $S_2$ and water. The solubility curve in FIG. 1 is in two parts. Line A–C represents the solid phase of the salt $S_1$, line B–C, the solid phase of salt $S_2$, in equilibrium with saturated solution. Thus, the figure represents a horizontal section at a definite temperature through a space model so that curves A–C and B–C are isothermal lines through the surfaces giving the conditions of equilibrium between saturated liquid and one solid phase. Point C of FIG. 1 is the isothermal invariant point in this temperature plane and represents the composition of liquid in equilibrium with the two solids $S_1$ and $S_2$.

Figure 2:
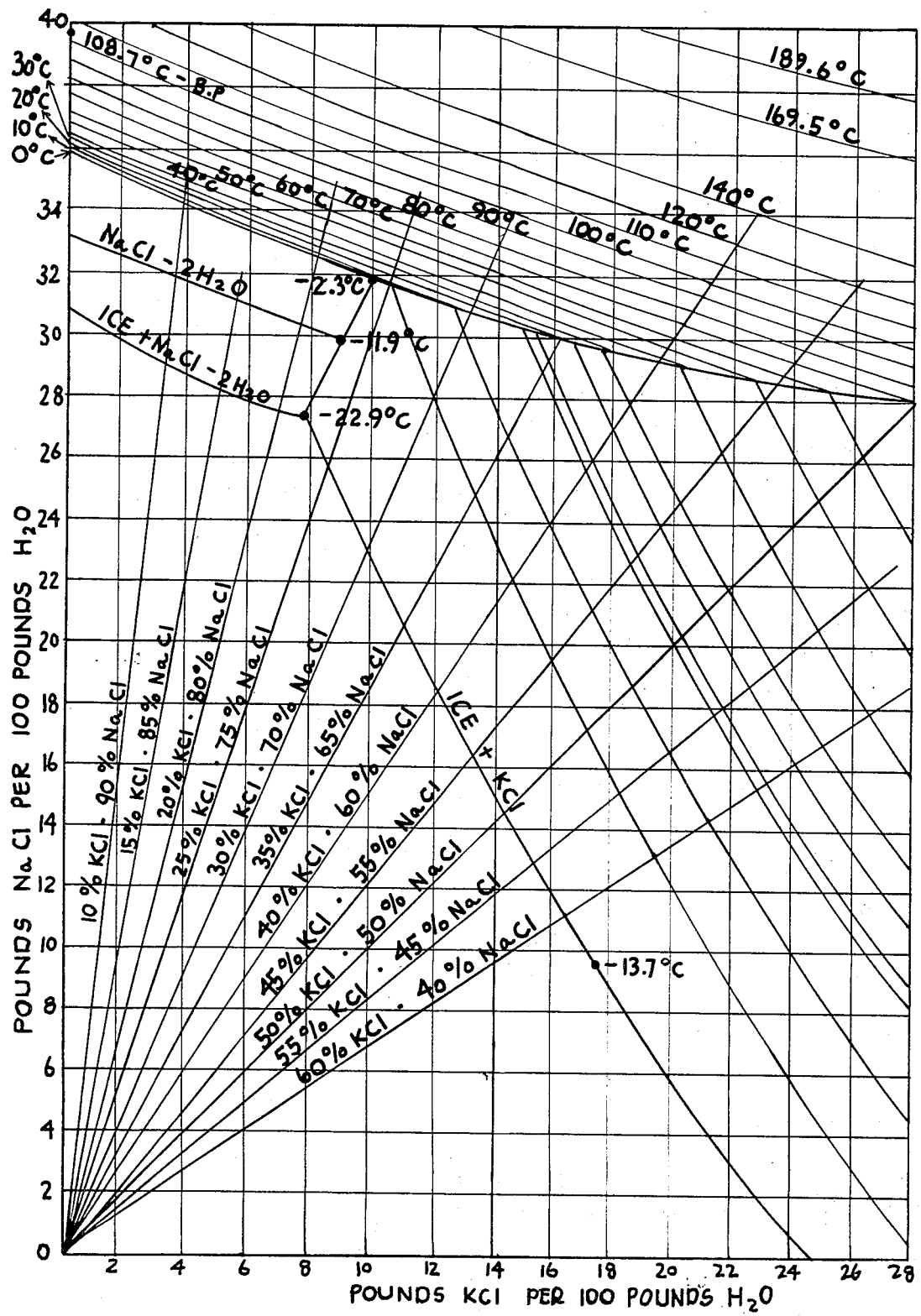
FIG. 2 represents a polythermal diagram showing a series of isotherms for several KCl-NaCl aqueous solutions.

In FIG. 2, the isothermal invariant compositions of several KCl-NaCl salt solutions at different solution temperatures are depicted. Using the information shown in these curves in a multiple effect evaporator system such as is shown in FIG. 3, high KCl recovery can be readily achieved in the evaporator shown even when premature crystallization of solids has occurred in early evaporator effects.

Thus, turning to FIG. 3, an evaporator train is shown in which an aqueous stream of KCl-NaCl is being fed via lines 21a and 41 to evaporator 4. Of the four evaporators 1, 2, 3 and 4 shown, evaporator 4 operates at the lowest temperature with evaporator 1 operating at the highest. The operating temperature of each evaporator is thus progressively lower in the direction of steam flow shown on the drawing. Thus, steam is introduced into evaporator 1, as shown by line 42. Vapors generated in evaporator 1 are fed to evapoator 2 via line 43. In the same manner, vapors generated in evaporators 2 and 3 are fed to evaporators 3 and 4 respectively, as shown by lines 44 and 45.

The KCl-NaCl solution entering evapoator 4 is subjected to evaporation and a portion of the water is removed therefrom. Since the feed solution is typically near saturation with respect to NaCl and only partially saturated with respect to KCl as it enters evaporator 4, and since the solubility of NaCl is not affected to any substantial degree by an increase or decrease in temperature, the loss of water in evaporator 4 results in the crystallization of substantial quantities of NaCl. Due to water removal in evaporator 4, KCl also may increase in concentration to a point where the KCl-NaCl invariant composition is reached and both salts crystallized. This NaCl and/or KCl-NaCl crystallized in evaporator 4 drops into the elutriation leg 12 of evaporator 4.

The solution passed into evaporator 3 is therefore at the invariant composition and is subjected to further evaporation at a temperature higher than that employed in evaporator 4 and further quantities of NaCl are crystallized and fall into the elutriation leg 13 of evaporator 3. Also, the KCl content of the solution is increased because of the increased temperature and the crystallization of the NaCl. This solution, depending on the flow regime used, may also reach the invariant point at the higher temperature and again crystallize additional KCl which falls into the elutriation leg 13 with the NaCl. As can be seen with reference to FIG. 2, the evaporation at differing temperatures results in a shift in the salt concentration of the solution as it moves forward toward evaporator 1. The NaCl is being crystallized and the solution is becoming more concentrated with respect to KCl. In some cases, depending on the evaporation occurring and the temperature of the third effect, the invariant point will not be reached and the solution will be saturated with the NaCl component only.

The solution from evaporator 3 is then passed into evaporator 2 which operates at a temperature higher than evaporator 3. In this evaporator the solids crystallized in evaporator 4 are introduced via line 16 into the solution contained in this evaporator 2. As will be seen from an examination of FIG. 3 this provides further quantities of KCl to be dissolved in the solution which is now substantially hotter than it was in evaporator 3 and thus more capable of dissolving further quantities of KCl, while retaining NaCl solids in evaporator 2. The NaCl content of the solution is substantially reduced because of the tendency of the solution to dissolve further quantities of KCl. The NaCl is crystallized in evaporator 2 and falls into the elutriation leg 14 of the evaporator 2. from where it is fed via line 30 to collection point 25. The solids in this leg contain little if any KCl.

The NaCl and KCl solids from evaporator 3 are fed into evaporator 1 in the same manner via line 17. The solution from evaporator 2 is fed into evaporator 1 via line 8 where it is raised substantially in temperature and further water is removed therefrom. Most of the KCl contained in the solids fed to evaporator 1 is dissolved therein while retaining NaCl solids in evaporator 1. Thus, a further reduction in the NaCl content is accomplished. Solids, mostly NaCl, falling into the elutriation leg 15 of the evaporator 1 are ultimately fed via line 31 to a collection point 25 where solids and liquid separation occurs. The quantity of KCl contained in the stream leaving evaporator 1 via line 9 is now higher than it would have been had the solids not been forwarded in the manner described. Thus, a product stream containing a high concentration of the desired KCl is obtained while the concentration of the undesirable NaCl has been reduced despite the fact that premature crystallization had occurred in the evaporator system.

The KCl product stream in line 9 which still contains appreciable quantities of NaCl is sent to a thickener 22. Thus, a potential loss of product has been prevented from occurring while a fixed evaporator system has, by the application of solids feeding from colder evaporator effects to hotter ones, been rendered more flexible in design. In this vessel the solids contained therein are settled out and are removed via line 23 to the collection point or tailings area 25. In line 23, a purge line 26 is provided and the stream line 23 is either continuously or intermittently purged to remove solid impurities such as calcium sulfate and calcium carbonate.

The overflow liquor from the thickener 22 is passed to a crystallizer operation where the KCl product is separated as pure product from the NaCl contained in the overflow liquor. The liquor from the crystallizer 27 is passed via line 28 to the evaporators 1, 2 and 3 in which it is used to provide dissolving liquid for the KCl content thereof. A purge line 29 is provided in line 28 to control the soluble impurities contained in this liquor. Lines 33, 34 and 35 feed liquor from line 28 to evaporators 1, 2 and 3, respectively. Line 36 feeds liquor from line 21 to evaporator 4. Thus, on a continuous or an intermittent basis as desired soluble impurities such as magnesium and calcium chloride can be removed from the system to prevent any buildup of these materials in the evaporation system. Purge streams 26 and 29 may be discarded or processed for their content if desired. The liquor from the tailings area 25 is passed via line 32 to evaporator 4 where it is used in part as feed thereto. Evaporators 1 and 2 have their elutriation legs fed with solution from line 28. Evaporators 3 and 4 have fluid supplied to their respective elutriation legs via line 21 which contains raw feed solution.

To illustrate the invention further, with reference to FIG. 2 a solution of KCl and NaCl containing 12.7 percent by weight KCl and 20.1 percent by weight NaCl is fed to evaporator 4 at a solution temperature of 48.89° C. Water is evaporated from the feed to vessel 4 and a solution containing 14.1 percent KCl and 17.6 percent NaCl is fed to evaporator 3 via line 6. A solid crystallizate containing KCl and NaCl is removed from leg 12 of evaporator 4 and this is forwarded to evaporator 2 via line 16. In evaporator 3 which has an operating temperature of 68.33° C., further quantities of water are removed from the KCl-NaCl solution. Leaving evaporator 3 the solution contains 15.5 percent KCl and 17.2 percent NaCl by weight. This solution is fed via line 7 to evaporator 2 and in this evaporator quantities of KCl contained in the solids fed thereto via line 16 are dissolved in the solution in the evaporator since this evaporator 2 is operating at temperature of 88.33° C. The solids in evaporator 3 which settled into elutriation leg 13 are forwarded to evaporator 1 and may contain KCl as well as NaCl. The solution from evaporator 2 is then fed to evaporator 1 via line 8 and contains 18.8 percent KCl and 16.0 percent NaCl. In evaporator 1 further quantities of KCl may be dissolved since this evaporator operates at 110.55° C. and solid KCl may be introduced via line 17 to the evaporator. Large quantities of NaCl are crystallized in evaporators 1 and 2 during the dissolution of KCl therein and the resulting product stream issuing via line 9 to thickener 22 contains a KCl content considerably higher than would be possible if the raw feed had only been subjected to a simple stepwise evaporation due to loss of KCl with the NaCl in the early stages of evaporation.

As can be seen from an examination of FIG. 2 at a temperature of 80° C. a 25 percent KCl–70 percent NaCl solution contains 34 pounds of NaCl and slightly less than 12 pounds of KCl basis 100 pounds of water. At 90° C. it can be seen that an invariant composition containing over 14 pounds of KCl and less than 34 pounds of NaCl exists. Thus, by evaporation of the raw feed solutions coupled with increased temperature of evaporation, it can be seen that the NaCl content of the mixed solutions can be lowered and the KCl content can be raised. The KCl forwarded with the solids recovered in the first two evaporator effects shown in the drawing is utilized to substantially increase the KCl content of the solutions fed to evaporators 1 and 2, and cause the crystallization of further quantities of NaCl, and the dissolution of KCl until the invariant composition is reached. Thus, the forwarding of KCl containing solids insures that the KCl content of the product stream will be as much as possible and that the NaCl content will be as little as possible.

While this invention has been discussed with particular reference to solutions of KCl-NaCl, it will be apparent that it will also apply to other salt solutions for example, NaCl-NaClO$_3$.

The quantity of solids sent forward to the hotter evaporator effects in accordance with this invention will vary depending upon the solution composition being fed. In general, the solids have sufficient KCl to insure that at the operating temperature of the hotter evaporator, that the invariant composition is approached (i.e. 90 to 98 percent of saturation) but not exceeded. This provides for the maximum amount of KCl in the product streams which is the desired goal since KCl is the desired product.

The evaporator temperatures are variable and will depend upon the type of multiple effect system employed and the most efficient conditions from the standpoint of steam economy. So long as each one operates at a temperature sufficient to evaporate water from the solution feed, the particular temperatures are of little moment. That the system operates such that the evaporator temperatures become progressively higher is important since the forwarding of the solids to the hotter evaporator effects is necessary to insure maximum dissolution of the salt that is more soluble in warmer solutions than in cooler ones. The kind of equipment employed is similarly of little importance and recourse to any conventional evaporator equipment may be had.

While the invention has been described with reference to a specific embodiment, it obviously is not intended that it be limited to that embodiment. Other salt solutions can be processed in this manner and the same salt solutions at different concentrations of the salts can be used. Thus, KCl-NaCl solutions having as low as 10 percent KCl or lower and the balance being mostly NaCl may be processed as well as KCl-NaCl solutions containing 20 to 25 percent KCl or even more with the balance being NaCl. Similarly solutions of NaCl-NaClO$_3$ with varying concentrations of both salts may be processed in like fashion. In like fashion while aqueous solutions have been dealt with in describing the invention, it is obvious that the invention also applies to salts in organic media where the solubility characteristics are similar, that is, where the solubility of one salt is temperature dependent while the other salt has a solubility not similarly affected by temperature (the ratio of the two salts in solution at saturation changes with temperature). Finally, while a specific feed of salts from one colder effect to a specific hotter effect is shown in FIG. 3, this is merely illustrative. So long as salts containing the desired salt are fed from a colder effect to a hotter effect, the ends of the invention will be realized and this feed need not be in the precise manner set out in the illustrative embodiment.

I claim:

1. A method for processing an aqueous feed solution containing a first salt and a second salt in a multiple effect evaporator system, the solubility of the first salt being more temperature dependent than the solubility of the second salt, comprising evaporating water from said feed solution in a first evaporation zone until the solution is saturated with respect to both salts and crystals of both salts are obtained in said first evaporation zone at the operating temperature thereof, feeding saturated solution from the first evaporation zone to a further evaporation zone operating at a temperature higher than the first evaporation zone, withdrawing crystals of said first salt and said second salt from said first evaporation zone, introducing such crystals into said further evaporation zone and dissolving crystals of said first salt in the solution present in the further evaporation zone while retaining solid crystals of said second salt therein, the amount of first salt crystals thus introduced being less than the quantity required to exceed the invariant composition of the solution in the further evaporation zone at the operating temperature thereof, evaporating water from the solution in the further evaporation zone until such solution approaches saturation with respect to said first salt, and removing such solution from the further evaporation zone.

2. The method of claim 1 wherein the first salt is potassium chloride and the second salt is sodium chloride.

3. The method of claim 1 wherein the solution removed from the further evaporation zone is 90 to 98 percent saturated with respect to said first salt.

4. A method of evaporating an aqueous feed solution containing a first salt and a second salt in a multiple effect evaporator system, the solubility of the first salt being more temperature dependent than the solubility of the second salt, comprising introducing feed solution into a first evaporator, evaporating water from the solution until it is saturated with respect to both salts and crystals of both salts are obtained in said first evaporator at the operating temperature thereof, feeding said saturated solution from the first evaporator to a second evaporator operating at a temperature higher than the first evaporator and evaporating water therefrom at least until the solution in the second evaporator is saturated with respect to the second salt and crystals of at least the second salt are obtained in the second evaporator, removing solution from the second evaporator and feeding said solution to a third evaporator operating at a temperature higher than the second evaporator, withdrawing crystals of said first salt and said second salt from the first evaporator, introducing such crystals into the third evaporator and dissolving crystals of said first salt in the solution present in the third evaporator while retaining solid crystals of said second salt therein, the amount of said first salt crystals thus introduced being less than the quantity required to exceed the invariant composition of the solution in the third evaporator at the operating temperature thereof, evaporating water from the solution in the third evaporator and removing solution that is nearly or completely saturated with respect to said first salt from the third evaporator.

5. The method of claim 4 wherein the first salt is potassium chloride and the second salt is sodium chloride.

6. The method of claim 4 wherein the solutions removed from the second and third evaporators are 90 to 98 percent saturated with respect to the first salt.

7. The method of claim 4 wherein the first salt is recovered from the solution removed from the third evaporator.

8. The method of claim 4 wherein the first salt is sodium chloride and the second salt is sodium chlorate.

9. A method for evaporating an aqueous feed solution containing a first salt and a second salt in a multiple effect evaporator system, the solubility of the first salt being more temperature dependent than the solubility of the second salt, comprising introducing feed solution into a first evaporator, evaporating water from the solution until it is saturated with respect to both salts at the operating temperature of the first evaporator and crystals of both salts are obtained in said first evaporator, feeding the saturated solution from the first evaporator to a second evaporator operating at a temperature higher than the first evaporator and evaporating water from the solution in the second evaporator until crystals of both salts are obtained in the second evaporator, removing solution from the second evaporator and feeding such solution to a third evaporator operating at a temperature higher than the second evaporator, withdrawing crystals of both salts from the first evaporator, introducing such crystals into the third evaporator and dissolving crystals of said first salt in the solution present in the third evaporator while retaining solid crystals of said second salt therein, the amount of said first salt crystals thus introduced being less than the quantity required to exceed the invariant composition of the solution in the third evaporator at the operating temperature thereof, evaporating water from the solution in the third evaporator at least until it is saturated with respect to the second salt, removing solution from the third evaporator and feeding such solution to a fourth evaporator operating at a temperature higher than the third evaporator, withdrawing crystals of both salts from the second evaporator, introducing such crystals into the fourth evaporator and dissolving crystals of said first salt in the solution present in the fourth evaporator while retaining solid crystals of said second salt therein, the amount of said first salt crystals thus introduced being less than the quantity required to exceed the invariant composition of the solution in the fourth evaporator at the operating temperature thereof, evaporating water from the solution in the fourth evaporator and removing solution that is nearly or completely saturated with respect to said first salt from the fourth evaporator.

10. The method of claim 9 wherein the first salt is potassium chloride and the second salt is sodium chloride.

11. The method according to claim 9 wherein the solutions removed from the third and fourth evaporators are 90 to 98 percent saturated with respect to the first salt.

12. The method of claim 9 wherein the first salt is recovered from the solution removed from the fourth evaporator.

13. The method of claim 9 wherein the first salt is sodium chloride and the second salt is sodium chlorate.

14. A method for processing an aqueous feed solution containing potassium chloride and sodium chloride in a multiple effect evaporator system, comprising the steps of introducing feed solution to a first evaporator, evaporating water therefrom until the solution is saturated with respect to potassium chloride and sodium chloride and a precipitate of potassium chloride and sodium chloride representing supersaturation at the operating temperature of the first evaporator is obtained therein, removing saturated solution from the first evaporator and feeding such solution to a second evaporator operating at a temperature higher than the first evaporator and evaporating water therefrom until the solution is saturated with respect to potassium chloride and sodium chloride and a precipitate of potassium chloride and sodium chloride representing supersaturation at the operating temperature of the second evaporator is obtained therein, removing saturated solution from the second evaporator and feeding such solution to a third evaporator operating at a temperature higher than the second evaporator, feeding potassium chloride and sodium chloride precipitated in the first evaporator to the third evaporator and dissolving potassium chloride in the solution present in the third evaporator while retaining solid sodium chloride therein, the amount of potassium chloride thus fed being less than the quantity required to exceed the invariant composition at the operating temperature of the third evaporator, evaporating water from the solution in the third evaporator until the solution therein approaches saturation with respect to potassium chloride, removing solution from the third evaporator and feeding such solution to a fourth evaporator operating at a temperature higher than the third evaporator, feeding potassium chloride and sodium chloride precipitated in the second evaporator to the fourth evaporator and dissolving potassium chloride in the solution present in the fourth evaporator while retaining solid sodium chloride therein, the amount of potassium chloride thus fed being less than the quantity required to exceed the invariant composition at the operating temperature of the fourth evaporator, evaporating water from the solution in the fourth evaporator until it approaches saturation with respect to potassium chloride, and removing such solution from the fourth evaporator.

15. The process of claim 14 wherein potassium chloride is recovered from the solution removed from the fourth evaporator.

16. The process according to claim 14 wherein the fourth evaporator operates at a temperature of from 82.22° C. to 148.9° C., the third evaporator operates at a temperature of from 65.56° C. to 126.67° C., the second evaporator operates at a temperature of from 48.89° C. to 93.33° C., and the first evaporator operates at a temperature of from 21.11° C. to 65.56° C.

17. The method of claim 14 wherein the solution removed from the fourth evaporator is processed in a crystallization step wherein solid product potassium chloride and a mother liquor are produced and wherein said mother liquor is used, in part, as feed solution to at least one of the fourth, third or second evaporators.

References Cited

UNITED STATES PATENTS

| | | | |
|---|---|---|---|
| 1,873,251 | 8/1932 | Allen et al. | 23—302 |
| 2,330,221 | 9/1943 | Kermer | 159—45 |
| 2,927,010 | 3/1960 | Baron | 23—302 |
| 3,365,278 | 1/1968 | Kelly et al. | 23—296 |
| 3,547,597 | 12/1970 | Hays | 23—302 |

NORMAN YUDKOFF, Primary Examiner

S. SILVERBERG, Assistant Examiner

U.S. Cl. X.R.

23—302, 303